Nov. 23, 1937.  R. P. LANSING  2,099,813
DRIVING MECHANISM
Filed April 28, 1931
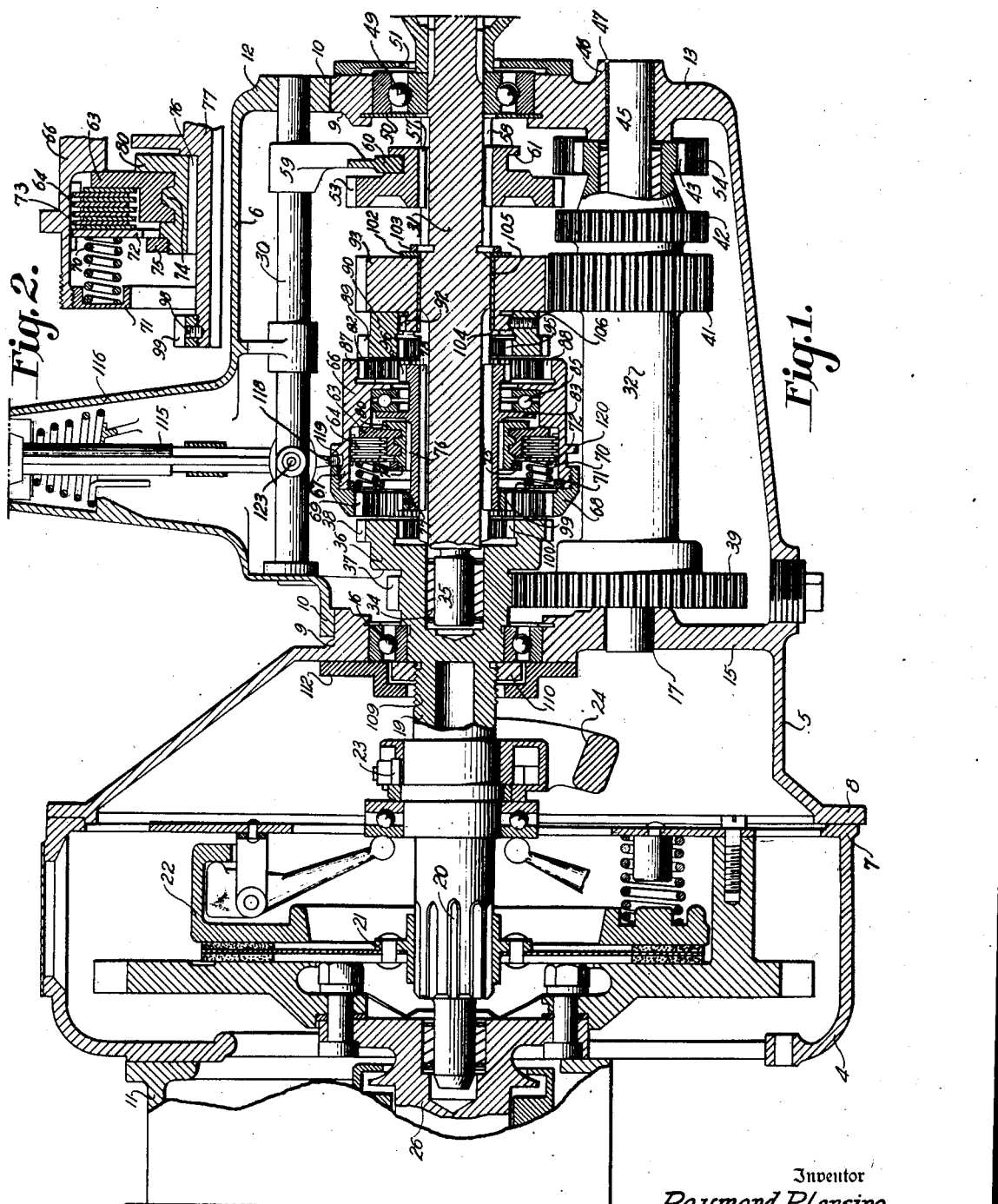
Inventor
Raymond. P. Lansing
By
F. B. Smith
Attorney Patented Nov. 23, 1937

2,099,813

UNITED STATES PATENT OFFICE 2,099,813

DRIVING MECHANISM

Raymond P. Lansing, Montclair, N. J.

Application April 28, 1931, Serial No. 533,564

1 Claim. (Cl. 74—370)

This invention relates to driving mechanisms and particularly to mechanisms of the type in which the driven member under certain circumstances becomes the driving member, and under other conditions runs faster than (or overruns) the driving member.

An object of the invention is to provide a mechanism of the foregoing character, which, although capable or adaptable to other uses, is particularly well suited for use as a motor vehicle transmission mechanism.

In motor vehicle operation it is desirable to provide means whereby traction members of the vehicle, after obtaining a certain momentum, may be drivably disconnected from the power shaft of the vehicle so that the traction members may continue to rotate at a speed faster than the then existing gear ratio between the power shaft and the traction members alone would permit. In the motor vehicle art, such disconnecting mechanisms are commonly referred to as free-wheeling or free-wheel devices, to which general class the present invention (in so far as it is used in the motor vehicle art) relates.

Another object of the invention is to provide a free-wheeling device of the foregoing character involving the use of a friction clutch mechanism of novel construction constituting a driving connection under certain conditions and being automatically releasable to permit free-wheeling under other conditions.

Another object of the invention is to provide in a device embodying friction clutch mechanism of the foregoing character, novel means for producing a preset resilient stress applicable to urge said friction clutch mechanism into position to transmit a predetermined torque, in conjunction with means for transferring the stress produced by said novel means to an adjacent member and thereby decrease or virtually eliminate the torque transmitting capacity of said clutch mechanism whenever free-wheeling operation is desired.

A further object of the invention is to provide a novel unitary mechanism combining the functions of a free-wheeling device with those of speed changing or gear shifting mechanisms, by the use of which not only the driving ratio, but also the driving relation of the parts of a power transmission system may be controlled automatically in response to manipulation of a single manually operable device. When this invention is supplied to a motor vehicle it provides means for obtaining free-wheeling action at will as an automatically operating incident to the establishment of different driving ratios between the motor and the traction members of the vehicle.

A further object of the invention is to provide in a combined free-wheeling and ratio changing device of the foregoing character, novel means for obtaining an automatic free-wheeling action for each of several different ratio settings of the speed changing or transmission mechanism, such operation being effected by operation of a single control member.

A further object of the invention is to provide in conjunction with novel preset stress supplying means of the foregoing character, a manually shiftable device capable of preventing the above described transfer of stress when it is desired to lock the mechanism against free-wheeling operation.

A further object of the invention is to provide a device of the foregoing character possessing practical merit because of its simplicity of construction, flexibility of operation, ease of installation and accessibility.

These and other objects and advantages to be derived from the use of the invention herein disclosed will become evident from an inspection of the following description when read with reference to the accompanying drawing illustrating one embodiment of the invention.

In the drawing:

Fig. 1 is a central longitudinal sectional view of a device embodying the invention showing the mechanism in the neutral position; and Fig. 2 is an enlarged view of certain details.

Referring to the drawing, the invention is shown embodied in a composite casing having two sections, 4 and 5, connected by suitable flanges 7 and 8; the section 5 having flat upper surfaces 9 for reception of registering surfaces 10 of a cover plate 6; the whole constituting a unitary housing closed at one end by a tubular casing 11 and at the other by the inwardly turned end portions 12 and 13 of members 5 and 6. A suitable supporting wall 15 is provided adjacent the edge 10 of cover plate 6, said wall having apertures for the reception respectively of a ball bearing 16 and an anti-friction bearing sleeve 17, the former being adapted to rotatably receive a shaft 19 having at its forward end a series of splines or other suitable fastening means 20 for drivable connection with the element 21 of a clutch assembly 22 representing the main clutch mechanism of a vehicle, and operable through a collar or yoke 23 and an arm 24 to drivably connect or disconnect the shaft 19 and the prime mover whose power shaft is indicated at 26.

The shaft 19 therefore constitutes the driving member with respect to the traction wheels or other driven member, between which and the member 19 is interposed the combined free-wheeling and gear shift mechanism adapted to drivably connect these elements.

In the embodiment shown, the novel combined free-wheeling and gear shift mechanism comprises the provision of a plurality of longitudinally extending shafts 31 and 32 preferably disposed in parallelism as indicated, with the shaft 31 constituting the propeller shaft serving to connect the mechanism with the traction members of the vehicle, the shaft 31 being preferably disposed in alignment with the shaft 19 and mounted for rotation relatively thereto, such rotation being facilitated by the provision of the roller bearing 34 interposed between the end 35 of the shaft 31 and the enlarged end portion 36 of the shaft 19. The said portion 36 of the shaft 19 is preferably provided with teeth 37 and 38, the former being adapted to mesh with the teeth of a gear 39, rigidly connected to or integral with the shaft 32 and constituting, with the pinion 37, a portion of the speed change mechanism.

The speed change mechanism further includes the provision of additional gears 41, 42 and 43, all preferably connected to or integral with the shaft 32, which is mounted on a supporting shaft 45 extending from end wall 15 to the boss 46 of end wall 13, the said boss being provided with a bushing 47 similar to the bushing 17 located at the opposite end of said shaft. A second opening is provided in the end portion 13 for the reception of a ball bearing member 49 rotatably supporting the shaft 31 and retained in place by the provision of a ring 50 and plate 51.

The speed change mechanism further comprises the provision of a shiftable gear 53 which, in the position shown in Fig. 1, is out of mesh but is adapted to be shifted either to the left or right to engage either gear 42 or gear 54, as the case may be, the latter being mounted on an idler shaft (not shown) for meshing and rotation with the gear 43. A suitable driving connection is provided between the shaft 31 and the gear 53 to constitute a positive driving connection in the angular direction, but permitting axial displacement of the gear 53. Such a connection preferably takes the form of splines on the internal and external surfaces respectively of the members 53 and 31, as indicated at 57 and 58. A yoke or shifter member 59 having a finger 60 engageable with a circumferential groove 61 in the gear 53, is provided on the shaft 30 so that upon movement of the shaft to the left or right by the actuation of the unitary control means to be described, the gear 53 will be correspondingly shifted.

The novel yielding clutch mechanism for drivably connecting the shaft 19 with the propeller shaft 31 preferably takes the form of an assembly of annular discs 64, the individual discs of which assembly are splined alternately to the splined circumferential surface of a sleeve or barrel 66, the latter being threaded at one end as indicated at 67 to engage a correspondingly threaded collar 68 provided with internal teeth or splines 69 adapted to mesh with the complemental formations 38, but out of engagement therewith in the position indicated in Fig. 1.

The novel clutch mechanism futher comprises the provision of resilient means adapted to exert an axial pressure on the discs 64 to create therein a torque transmitting capacity permitting establishment of driving relation between the barrel 66 and the nut 63. As shown, such resilient means takes the form of a nest of coiled springs 70 disposed in spaced angular relation about the circumference of a flanged retaining ring 71 having a threaded circumferential surface for engagement with corresponding internal threads at the end of the barrel 66, the opposite ends of the springs being adapted to bear against a collar 72 abutting the shoulder 73 (Fig. 2) formed on the splined internal surface of the barrel 66. The thread of the nut 63 is adapted to engage a corresponding thread formed on the external surface of threaded sleeve or screw 74, which at one end is provided with a finer thread for engagement with a correspondingly threaded nut 75; the internal surface of the screw 74 being drivably connected to sleeve 77 by splines 76 or other suitable means insuring rotation in unison with the sleeve 77, and the internal diameter of the screw 74 being such as to permit assembly of the parts by sliding the screw along the splines on the outer end of the sleeve 77.

The sleeve 77 is preferably connected to shaft 31 by suitable splines 78 insuring rotation of these two members in unison but permitting limited longitudinal movement of the former relative to the latter. The screw 74 is preferably formed at the end opposite the washer 72 with a flange 80 of larger diameter than the threaded portion of the screw, the said flange being adapted to abut a similar flange in which the nut 63 terminates, axial movement of the latter being likewise limited by its engagement with a shoulder formed substantially intermediate the ends of member 66, as shown clearly in Figs. 1 and 2. The member 66 is further provided with an inwardly extending flange 82 which (in conjunction with a flange on sleeve 77) forms a pocket for the reception of a ball bearing member 85 serving to facilitate relative rotation between the parts, as well as insuring corresponding axial movement of the sleeve 77 in response to axial movement of the member 66. The latter is further provided with an annular rim or ledge 87 on the internal surface of which are formed splines or teeth 88, which, in the position shown in Fig. 1, are out of engagement with corresponding teeth or splines 89, on the external surface of member 90, but which are adapted to engage therewith on axial movement of the member 66 to the right by operation of the control mechanism to be described hereinafter.

The member 90 is preferably supported by meshing engagement with a toothed or splined hub 92 extending from the main body of a gear 93 which, as shown, is integral therewith and which gear is adapted to mesh with the gear 41 previously described. The member 90 is further provided with a second set of teeth or splines 95 which, in the position shown in Fig. 1, are out of engagement with the teeth or splines 96 formed on the end of the sleeve 77, but are engageable by said teeth on axial movement of said sleeve to the right of the position shown in Fig. 1. The opposite end of the sleeve 77 has threaded and keyed thereon, by means of set screw 98, a splined nut or collar 99 for engagement, on axial movement to the left, with the internal teeth or splines 100 of the member 36.

Suitable means are provided for preventing axial movement of gear 93 while at the same time permitting relative rotation thereof with respect to shaft 31. As shown, such means comprises the provision of a retaining ring 102 locked to shaft 31 by suitable means 103 and therefore preventing—in conjunction with shoulder 104—axial displacement of gear 93. A spacer sleeve 105 is also provided between the shaft 31 and gear 93 to facilitate free rotation of the latter. Gear 93 is therefore free to rotate on shaft 31, and is held from lateral movement by the shoulder 104, and the lock ring 103. A set screw 106 may be provided to lock member 90 to gear 93.

Axial movement of the shaft 19 is prevented by suitable means, which, as illustrated, takes the form of a threaded portion 109 adapted to engage a correspondingly threaded nut 110 which also serves to maintain in place the bearing 16 and is in turn surrounded by an annular plate 112 suitably fixed to the transversely disposed wall 15 of the section 5.

Novel means for effecting combined operation and control of the free-wheeling and gear shift mechanism comprises the provision of a vertically disposed rod or shift lever 115 extending through the projecting conical boss 116 of the housing 6 and into operative relation with a semi-circular yoke 118 mounted on the usual slide rail (not shown) which parallels the rail 30, the shift lever being also engageable with a part 123 mounted on the rail 30, for the purpose of shifting the gear 53. Yoke 118 is in turn engageable with circumferential groove 119 formed between the end of the member 68 and the circumferential flange 120 of the member 66. With this construction the members 30, 66 and 68 may all be shifted by actuation of the unitary control means 115.

Having thus enumerated the parts entering into the embodiment of the invention herein disclosed, the operation thereof under different conditions will now be briefly reviewed.

If it be desired to operate the driven shaft 31 through the highest gear ratio, the control lever 115 is moved to the left, as viewed in Fig. 1, sufficiently to mesh the internal splines or teeth 69 of the member 68 with the external splines or teeth 38 on the member 36, the shift being carried just sufficiently to effect such engagement, but no further.

Assuming the engine-connected shaft 19 is rotating in a clockwise direction (as viewed from the left of Fig. 1) meshing engagement between the members 68 and 36 will cause a corresponding clockwise rotation of the member 66. Now assuming the nut 63 to be in the relative (extreme right) position indicated in Fig. 2, the stress of springs 70 will be absorbed by the abutment constituted by the above described shoulder 73, and therefore the only driving pressure between adjacent discs 64 will be that due to the nature of the surfaces therebetween and any deposit on such surfaces, such as solid or semi-solid particles of lubricant. The construction is preferably such that under these conditions there will be some slight friction, sufficient to transmit enough torque to cause rotation of the nut 63. Such rotation will produce a jackscrew action (the direction of the thread being appropriate for the purpose) between the nut and the sleeve 74, the latter being restrained from corresponding rotation by the inertia of the parts with which it is engaged.

The jackscrew action just referred to will cause the nut 63 to travel to the left, as viewed in Fig. 1, until it abuts the nut 75, whereupon further movement to the left is prevented. However, this movement is sufficient to move plate 72 away from abutment 73 and thereby transfer the pressure of the springs 70 from said abutment to the discs 64, increasing their torque transmitting capacity to such an extent that a practically positive driving connection is effected between the barrel 66 and the screw 74. The stress of the springs, the number of discs, the radius of the discs, and the friction acting thereon are preferably so regulated that, under the conditions just described, the clutch is able to transmit a drive which is capable of handling the maximum torque requirements of the vehicle while at the same time being yieldable to absorb any excessive shock imparted thereto.

Since the sleeve 77, the screw 74 and shaft 31 are connected for positive unitary rotation, it is evident that under the condition just described, the mechanism is effective to transmit rotary movement to the shaft 31 at the same speed of rotation as that of the shaft 19.

Under the foregoing conditions, the novel free-wheeling mechanism is effective to permit shaft 31 to overrun shaft 19 as soon as the momentum of the vehicle tends to drive the shaft 31 faster than the engine is driving the shaft 19. This free-wheeling action will occur automatically by reason of the jackscrew action which will be produced between the members 63 and 74 on every such occasion, such jackscrew action being the reverse of that above referred to. That is, when the screw 74 tends to exceed the rotary speed of of the nut 63, such tendency will produce an axial reaction causing nut 63 to return to the position shown in Fig. 1, and thereby permit the springs 70 to return the plate 72 to abutting relation to the shoulder 73, whereupon the discs 64 are relieved entirely of the pressure of said springs and will again permit practically unrestrained rotation of the members 74 and 63 at a speed in excess of that of the shaft 19 and the barrel 66. Hence there will be no reverse torque transmission from shaft 31 to shaft 19 and free relative rotation therebetween will continue until the excess momentum of the vehicle is dissipated, or until the engine is accelerated to equal the speed of the traction influenced shaft 31; whereupon the clutch will again become effective to transmit full driving torque by a repetition of the action previously described.

Prior to such automatic return of driving relation between shafts 19 and 31, such a condition may be effected manually, or arbitrarily, by moving the lever 115 one stage further to the left. Such additional movement to the left will cause teeth or splines 99 on the member 77 to engage the corresponding teeth or splines 100 on the member 36, whereupon a positive driving connection is effected directly from the shaft 19 to the member 77, and hence to the shaft 31 through splines 78. Such action may be termed a "locking-out" or "lock-out" of the free-wheel function. It is of course to be understood that the shafts 19 and 31 should be prepared for this lock-out function by accelerating the engine sufficiently to cause the speed of shaft 19 to approximate that of the shaft 31 in order to effect easy engagement between the teeth 99 and 100.

When it is desired to drive the shaft 31 through the intermediate gear ratio controlled by the gears 41 and 93, and at the same time provide a free-wheeling effect, this condition may be produced by shifting lever 115 to the right sufficiently to move the internally toothed or splined rim 87 of the barrel 66 into engagement with the corresponding teeth or splines 89 on the member 90. By this means, the gear 93 which previously floated freely around the shaft 31 is now operative to drivably connect the engine shaft 19 with shaft 31, the drive passing by way of the gears 37, 39, 41 and 93, splines 92, member 90, splines 89, barrel 66 and the clutch assembly 64 to the shaft 31 through the connection previously described with reference to the high gear ratio drive. With the drive passing through the connection just referred to, it will be obvious that an automatic free-wheeling effect will be produced in the same manner as above described whenever the shaft 31 tends to overrun the shaft 19. During use of this intermediate gear ratio, the free-wheeling function may be eliminated or locked-out by shifting the lever 115 one stage further to the right to cause teeth or splines 96 to register with corresponding teeth or splines 95 on the member 90. When such meshing relation is established a positive drive is effected from the gear 93 to the shaft 31 by way of the member 90 and the sleeve 77 and the yielding clutch mechanism is thereby shunted out of the path of torque transmission. The same shunting occurs whenever gear 53 is shifted to mesh with gears 42 or 54, it being understood, however that the free-wheeling effect may be extended (by appropriate modification of the structure) to all gear settings, if so desired.

There is thus disclosed a combined free-wheeling and gear shift mechanism of relatively simple construction, maximum flexibility of operation and positive both in its automatic and manual actuation, and which is applicable, because of its compact and unitary construction, to any type of power transmission, and is also adapted to be located in different positions in the same power transmission system or motor vehicle power plant. Moreover, as above suggested, by extension or duplication of the parts, the combined free-wheeling and ratio changing operation may be made applicable to any number of different combinations of gear shifts, as, for example, those indicated by the provision of gears 42, 43, 53 and 54, in the accompanying drawing, these gears corresponding to what are commonly termed first gear and reverse gear in the usual motor vehicle transmission.

As illustrated in the accompanying drawing, however, and by present preference, these gear combinations are effective independently of the free-wheeling mechanism, (except in so far as they are controlled by actuation of the same control lever 115) and thus on the shifting of the lever 115 to the proper angle, the shaft 30 is moved axially sufficiently to cause shifter member 59 to move the gear 53 into engagement with the gear 42 to produce driving connection with the shaft 31 through the first or low gear ratio, and upon opposite movement, with the gear 54 to drive the shaft 31 in the reverse direction. In either case, the drive is by way of the gears 37, 39 and shaft 32, and is exclusive of the yielding clutch mechanism. However, as above stated, this arrangement may be revised so as to make these gear combinations subject to the free-wheeling action also.

It is to be understood that various other changes may be made in the form, details of construction, arrangement of parts and the uses to which they are applied, without departing from the spirit of the invention or the scope of the appended claim.

What is claimed is:

In a variable speed transmission, a driving shaft, a driven shaft, means including a set of interengaging friction plates for connecting the shafts in a high speed ratio, means for connecting the shafts in a lower speed ratio, said connecting means being selective, manually operable means for disconnecting the friction plates from the driving shaft, slidable means operatively connected to the driven shaft, and associated with the manually operable means, to connect the shafts through the lower speed ratio and means including a torque responsive screw for controlling the engaging pressure acting upon said friction plates.

RAYMOND P. LANSING